United States Patent
Wei et al.

(10) Patent No.: US 9,643,148 B2
(45) Date of Patent: May 9, 2017

(54) METHODS FOR SURFACTANT REMOVAL FROM NANOPARTICLE SUSPENSIONS

(71) Applicant: Purdue Research Foundation, West Lafayette, IN (US)

(72) Inventors: Alexander Wei, West Lafayette, IN (US); Jonathan G Mehtala, Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 29 days.

(21) Appl. No.: 14/830,787

(22) Filed: Aug. 20, 2015

(65) Prior Publication Data

US 2016/0051955 A1 Feb. 25, 2016

Related U.S. Application Data

(60) Provisional application No. 62/039,471, filed on Aug. 20, 2014.

(51) Int. Cl.
 *B01J 13/00* (2006.01)
 *B82Y 40/00* (2011.01)
(52) U.S. Cl.
 CPC ....... *B01J 13/0034* (2013.01); *B01J 13/0043* (2013.01); *B01J 13/0086* (2013.01); *B82Y 40/00* (2013.01)

(58) Field of Classification Search
 CPC .................. B01J 13/0034; B01J 13/0043
 USPC ........................................... 424/9.1
 See application file for complete search history.

(56) References Cited

PUBLICATIONS

Kawamura, G., et al., End-to-End Assembly of CTAB-Stabilized Gold Nanorods by Citrate Anions. J. Phys. Chem. C 2008, 112, 10632-10636.
Dreaden, E.C., et al., The golden age: gold nanoparticles for biomedicine. Chem. Soc. Rev., 2012, 41, 2740-2779.
Long, L., et al., Gold Nanorods as Contrast Agents for Biological Imaging: Optical Properties, Surface Conjugation and Photothermal Effects. Photochemistry and Photobiology, 2009, 85: 21-32.
Yamashita, S., et al., Controlled-Release System Mediated by a Retro Diels-Alder Reaction Induced by the Photothermal Effect of Gold Nanorods. Langmuir 2011, 27, 14621-14626.
Wijaya, A., et al., Selective Release of Multiple DNA Oligonucleotides from Gold Nanorods. ACS Nano, vol. 3, No. 1, 80-86 (2009).
Jackson, S. R., et al., Where's the Silver? Imaging Trace Silver Coverage on the Surface of Gold Nanorods. J. Am. Chem. Soc. 2014, 136, 5261-5263.
Swarnapali, A., et al., Ligand Exchange on Gold Nanorods: Going Back to the Future. Part. Part. Syst. Charact. 2014, 31, 819-838.

*Primary Examiner* — Edward Cain
(74) *Attorney, Agent, or Firm* — Purdue Research Foundation (57) ABSTRACT

The present disclosure relates to the cleansing of nanoparticles in aqueous cationic surfactant solutions, including polyalkylammonium salts such as cetyltrimethylammonium bromide, as demonstrated by surfactant exchange, followed by the addition of peptizing agents to stabilize the cleansed nanoparticle solutes.

15 Claims, 9 Drawing Sheets

METHODS FOR SURFACTANT REMOVAL FROM NANOPARTICLE SUSPENSIONS

CROSS-REFERENCE TO RELATED APPLICATIONS

The present patent application is related to and claims the priority benefit of U.S. Provisional Patent Application Ser. No. 62/039,471, filed Aug. 20, 2014, the contents of which is hereby incorporated by reference in its entirety into this disclosure.

TECHNICAL FIELD

The present disclosure generally relates to the cleansing of nanoparticles prepared in aqueous micellar solutions, and in particular to a method for removing cationic surfactants such as tetraalkylammonium salts from metal nanoparticle suspensions, as illustrated by the conversion of cetyltrimethylammonium bromide (CTAB)-stabilized gold nanorods into citrate-stabilized gold nanorods, with complete removal of CTAB from the final suspension.

BACKGROUND

This section introduces aspects that may help facilitate a better understanding of the disclosure. Accordingly, these statements are to be read in this light and are not to be understood as admissions about what is or is not prior art.

Gold nanoparticles are widely used as conjugates and contrast agents for a variety of applications in imaging and nanomedicine. They support surface plasmon modes that can be tuned as a function of size, shape, and aspect ratio, with optical resonances ranging from visible to infrared wavelengths. Gold nanoparticles can be made with well-defined shapes: For example, gold nanorods (GNRs) are anisotropic variants of gold nanoparticles with optical resonances defined by their aspect ratio. GNRs have been investigated as contrast agents for optical biomedical imaging modalities such as optical coherence tomography and photoacoustic tomography; they are also capable of producing linear and two-photon excited luminescence, with detection limits at the single-particle level. The large absorption cross sections of GNRs can also generate localized photothermal effects, with application toward the release of molecular cargo and hyperthermic effects on diseased cells and tissues. These attributes have sparked a global effort to develop GNRs into theranostic agents for nanomedicine.

One hurdle in the scalable manufacturing of nanomaterials based on GNRs and other anisotropic gold nanoparticles is the efficient exchange and removal of cationic surfactants such as cetyltrimethylammonium bromide (CTAB), a micellar surfactant commonly used in the batch synthesis of GNRs. CTAB is cationic and moderately cytotoxic (although not insupportably so), much of which can be removed by multiple washes and exchanges with chemisorptive surfactants (e.g., PEGylated thiols or dithiocarbamates), phospholipids, or other surface-active agents. However, CTAB-coated GNR dispersions are frequently destabilized during surfactant exchange, resulting in partial aggregation and low recovery yields. Furthermore, ligand-modified GNRs are often contaminated with residual CTAB, which can induce nonspecific protein adsorption and cell uptake under physiological conditions, or produce surface charge defects in materials applications. It has been shown that CTAB-depleted GNR dispersions can be prepared when using sodium polystyrenesulfonate (Na-PSS) as a mild detergent; nevertheless, the stability of such suspensions remains capricious in subsequent manipulations. There is therefore an unmet need for a practical method for producing CTAB-free GNR dispersions that is universally compatible with surface conjugation protocols.

SUMMARY

In one aspect, a method for making metal nanoparticle suspensions free of cationic surfactants is disclosed, as demonstrated by the conversion of cetyltrimethylammonium bromide (CTAB)-stabilized gold nanorods (GNRs) into citrate-stabilized GNR suspensions free of CTAB. In this instance, the method starts with a GNR suspension containing excess CTAB, concentrating the suspension in a way that removes excess cationic surfactant, diluting the concentrated GNR suspension and subjecting it to at least one cycle of centrifugation and redispersion using a mild detergent to deplete CTAB to trace levels, resulting in a CTAB-depleted GNR suspension, and subjecting the CTAB-depleted GNR suspension to at least one cycle of centrifugation and redispersion in aqueous solutions of sodium citrate to produce a suspension of citrate-stabilized GNR completely devoid of CTAB as well as the detergent.

In yet another aspect, the suspension of GNRs in CTAB solution is concentrated using stirred ultrafiltration. In another aspect, the mild detergent is sodium polystyrenesulfonate (Na-PSS), applied as an aqueous 0.15 wt % solution. In yet another aspect, the method further includes diluting the CTAB-depleted GNR suspension prior to subjecting it to at least one cycle of centrifugation and redispersion in Na-PSS solution.

In yet another aspect, the GNR suspension is subject to three cycles of centrifugation and redispersion in aqueous detergent or water. The CTAB-depleted GNR suspension is subjected to two additional cycles of centrifugation and redispersion in aqueous sodium citrate. In another aspect, the sodium citrate solution has a concentration between 10 μM and 10 mM. In yet another aspect, the overall conversion of GNRs suspended in CTAB solutions to GNRs suspended in solutions devoid of CTAB is between 75% to 85%, based on the optical densities of normalized suspensions.

BRIEF DESCRIPTION OF THE DRAWINGS

FIGS. 4a and 4b are statistically identical.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
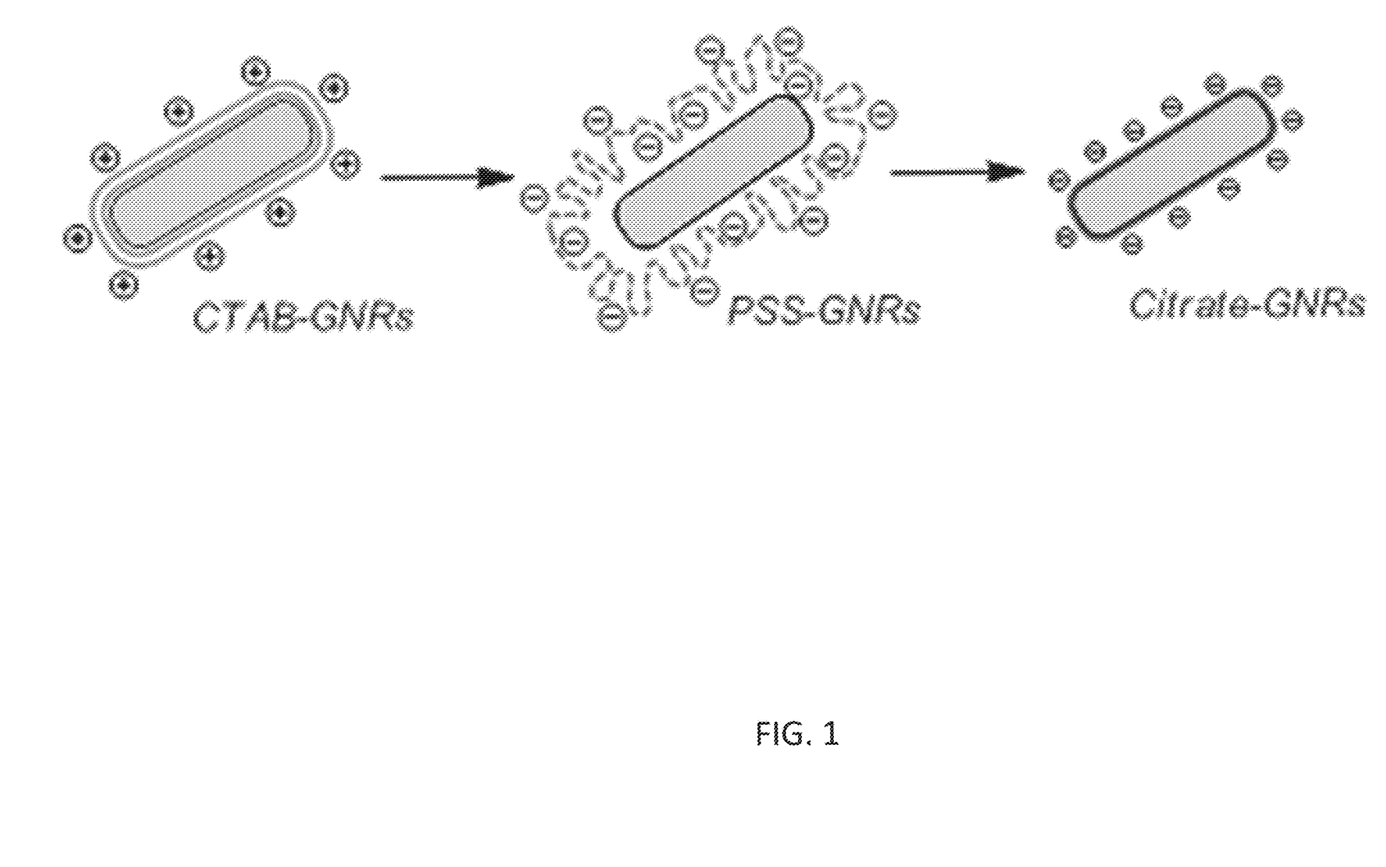
FIG. 1 is an illustration of an embodiment of the herein disclosed method for removing cetyltrimethylammonium bromide (CTAB) from aqueous suspensions of gold nanorods (GNRs) via intermediate treatment with polystyrenesulfonate (PSS), followed by further exchange with sodium citrate to produce citrate-stabilized GNRs (cit-GNRs).

Referring to FIG. 1, in one embodiment, described herein is an efficient method for removing cetyltrimethylammonium bromide (CTAB) from aqueous suspensions of gold nanorods (GNRs) via intermediate treatment with polystyrenesulfonate (PSS), followed by further exchange with sodium citrate to produce citrate-stabilized GNRs (cit-GNRs). Citrate-stabilized nanoparticles are well known to support a variety of surface modification protocols in aqueous media, with minimal interference by the displaced electrolyte. The surface exchange process was monitored in stages by x-ray photoelectron spectroscopy (XPS), an invaluable tool for quantitative elemental analysis of surface adsorbates, as well as by attenuated total reflectance infrared (ATR-IR) spectroscopy and surface-enhanced Raman scattering (SERS). Analyses indicate that CTAB removal by PSS treatment is highly efficient, as is the subsequent displacement of PSS by citrate. The cit-GNRs are fully dispersible in low-salt solutions, and are easily functionalized by further ligand exchange.

EXAMPLE

A six-stage protocol was developed to convert CTAB-GNRs (68×26 nm, $\lambda_{LPR}$=713 nm) into cit-GNRs, using standard ultrafiltration and centrifugation equipment. CTAB-GNRs were prepared on a gram scale by the method described by Khanal and Zubarev, then diluted with water to prevent premature flocculation of CTAB-GNRs during the initial purification stages. In a typical process, a suspension of GNRs (optical density (O.D.)=3.2) stabilized in 25 mM CTAB was concentrated to a few mL by stirred ultrafiltration to remove excess surfactant, then diluted with deionized water (Stage 1).

Figure 2:
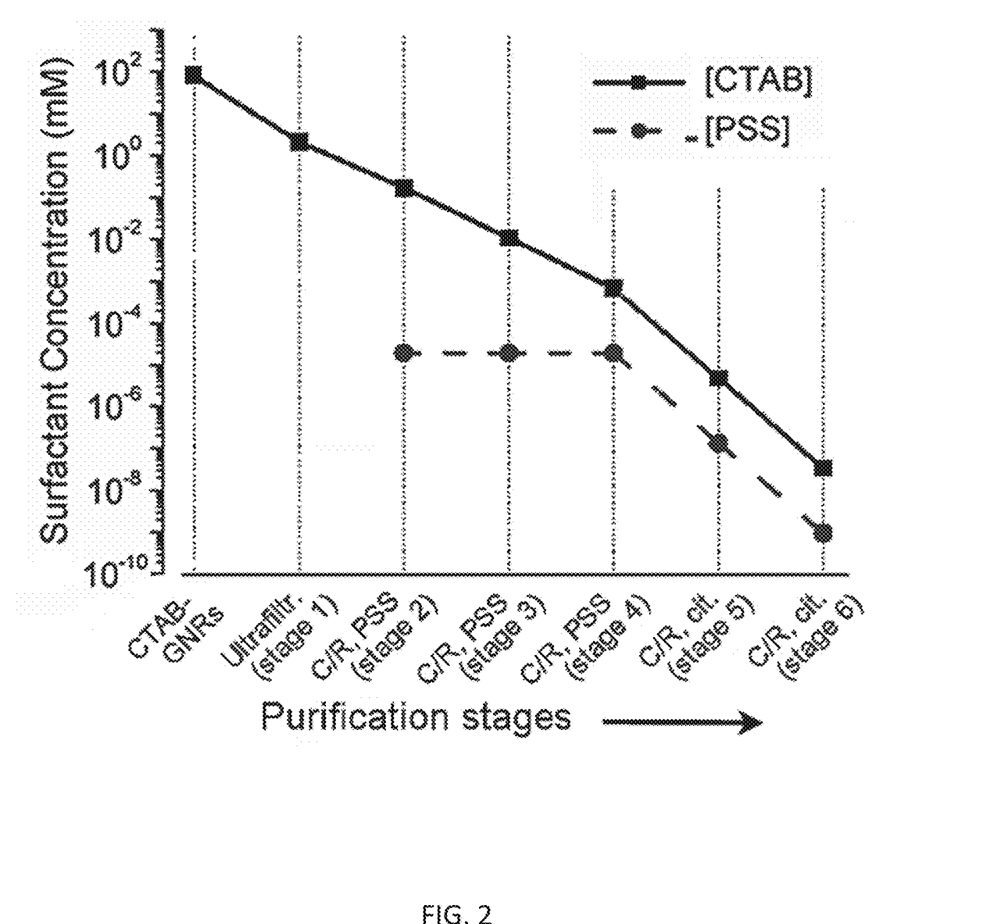
FIG. 2 is a process flow diagram for converting CTAB-GNRs into cit-GNRs by ultrafiltration (stage 1) with successive centrifugation/redispersion (C/R) cycles using 0.15 wt % Na-PSS (stages 2-4) and 5 mM $Na_3$-cit (stages 5 and 6), with estimated surfactant concentrations after each stage).

Referring to FIG. 2, a process flow diagram is presented for converting CTAB-GNRs into cit-GNRs by ultrafiltration (stage 1) with three centrifugation/redispersion (C/R) cycles using 0.15 wt % Na-PSS ($M_w$=70 kDa; stages 2-4), and 2 C/R cycles using 5 mM Na$_3$-cit (stages 5 and 6), with estimated surfactant concentrations after each stage. The first three C/R cycles depleted CTAB to trace levels: the residual CTAB in the PSS-stabilized GNR suspension after Stage 4 is <1 μM based on simple dilution factors, however the free CTAB concentration is likely even lower due to its favorable adsorption to PSS. The PSS-GNRs were then subjected to two additional C/R cycles using 5 mM sodium citrate (Stages 5 and 6) for exchange with PSS, yielding stable dispersions of cit-GNRs. A complete procedure with exact volumes and concentrations is provided in Appendix-A.

Figure 3:
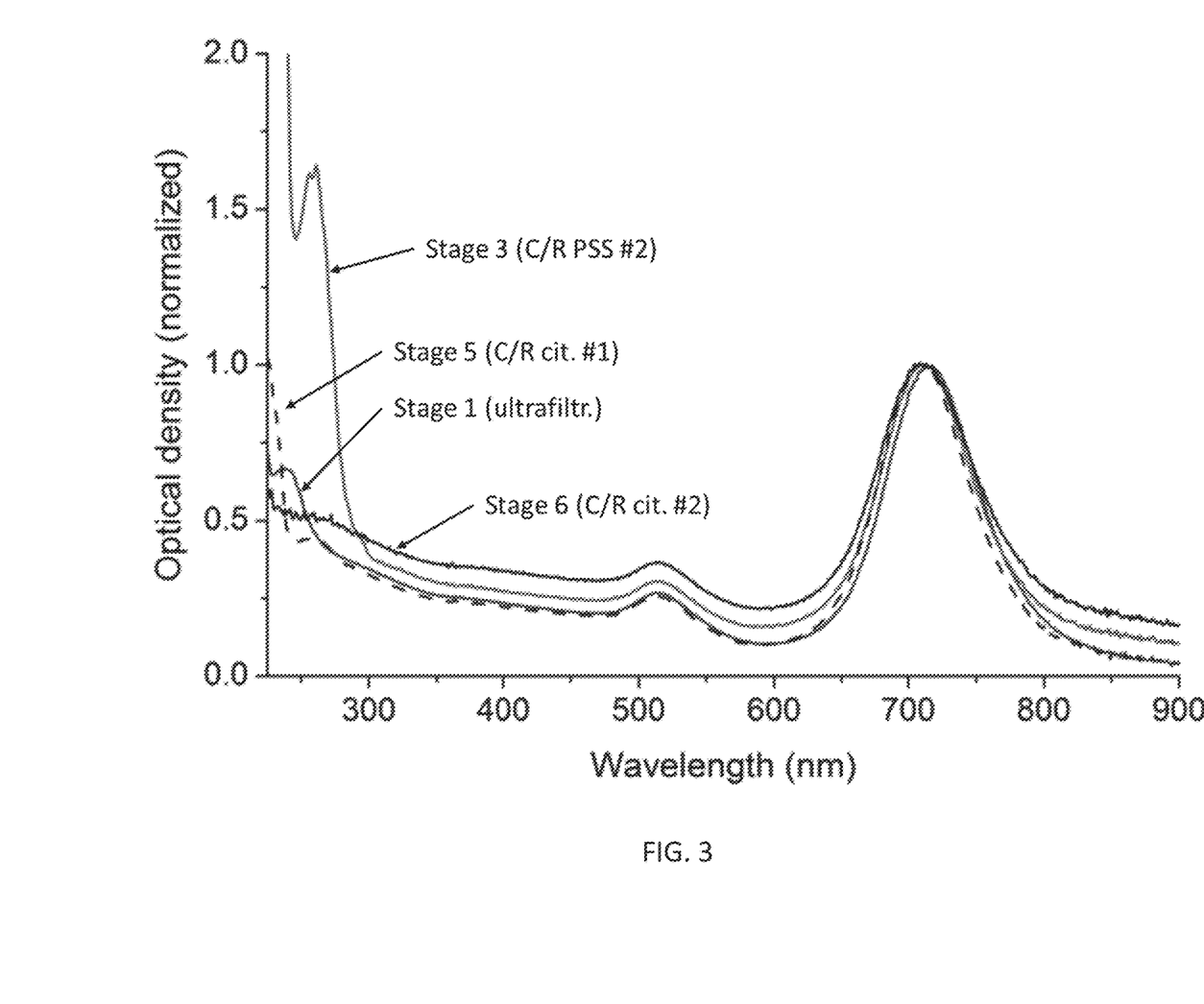
FIG. 3 shows normalized spectra of GNR dispersions at various stages of the cleansing process, illustrating the stability of said dispersions.
Figure 4A:
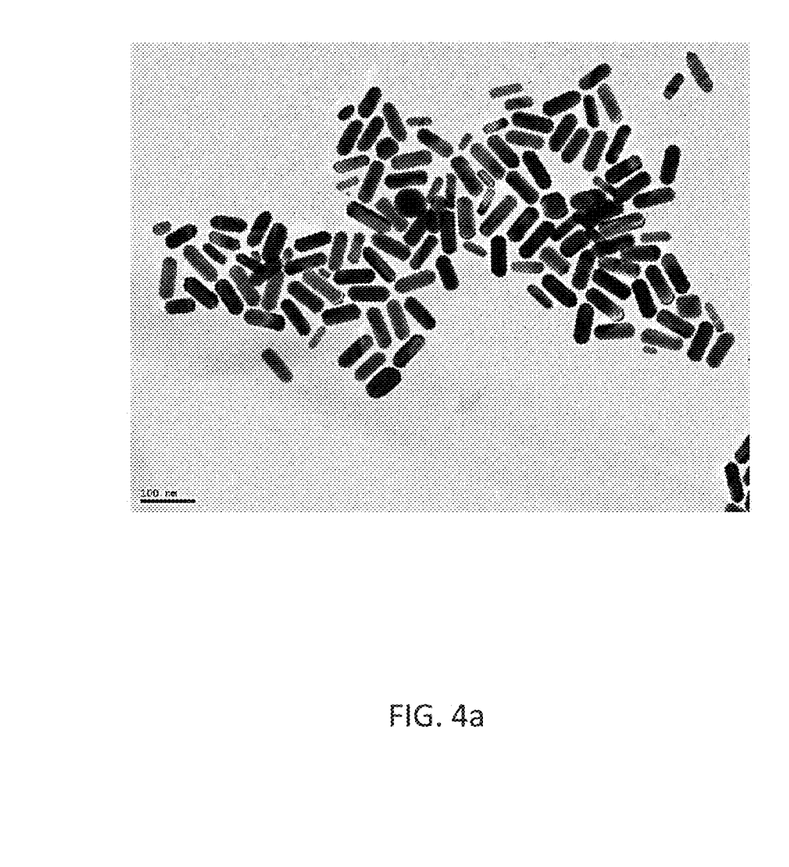
FIG. 4a is a transmission electron microscope (TEM) image of GNRs initially stabilized in CTAB solutions, deposited onto a carbon-coated TEM grid.
Figure 4B:
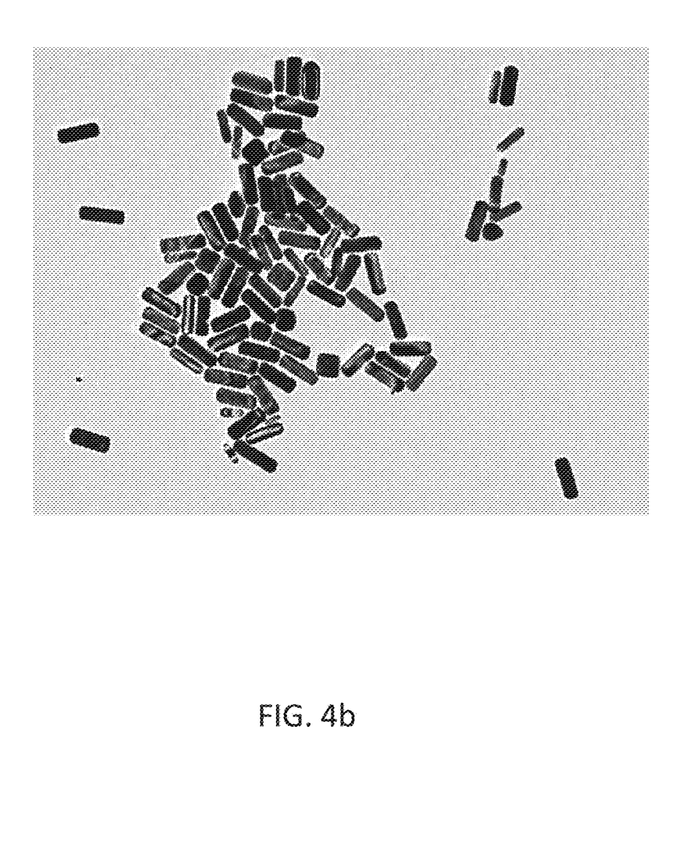
FIG. 4b is a TEM image of GNRs initially stabilized in CTAB solutions, deposited onto a carbon-coated TEM grid.

The conversion of CTAB-GNRs into cit-GNRs was achieved with an overall efficiency of 75-85%, based on initial and final optical density (O.D.) values of the GNR dispersions at 713 nm. The main source of loss is due to incomplete recovery of GNRs during the first two C/R cycles. Absorption spectroscopy and TEM analysis of the citrate-stabilized GNRs indicated essentially no changes in optical absorption (FIG. 3, which are normalized spectra of GNR dispersions after Stages 1, 3, 5 and 6) or size distribution (FIGS. 4a and 4b, which are respectively TEM images of CTAB-stabilized GNRs (68.2×26.2 nm; N=102) and citrate-stabilized GNRs (68.5×25.7 nm; N=134)). On the other hand, the exchange of PSS to citrate was readily discernible by electrokinetic measurements: the zeta potential of GNRs in dilute Na-PSS solution (0.25 mg/mL, pH 5) was −55.6±8.3 mV, while that of cit-GNRs in dilute phosphate buffered solution (PBS) adjusted to pH 9.5 (I~8.2 mM) was less negative (mean −26.9±13.2 mV; mode −21.1±7.1 mV). The cit-GNR suspensions are stable for months at low ionic strength (I<0.1 M) but aggregate if dispersed in 1 M NaCl or standard PBS buffer. It is thus concluded that the cit-GNRs behave similarly as other citrate-stabilized Au nanoparticles.

Figure 5:
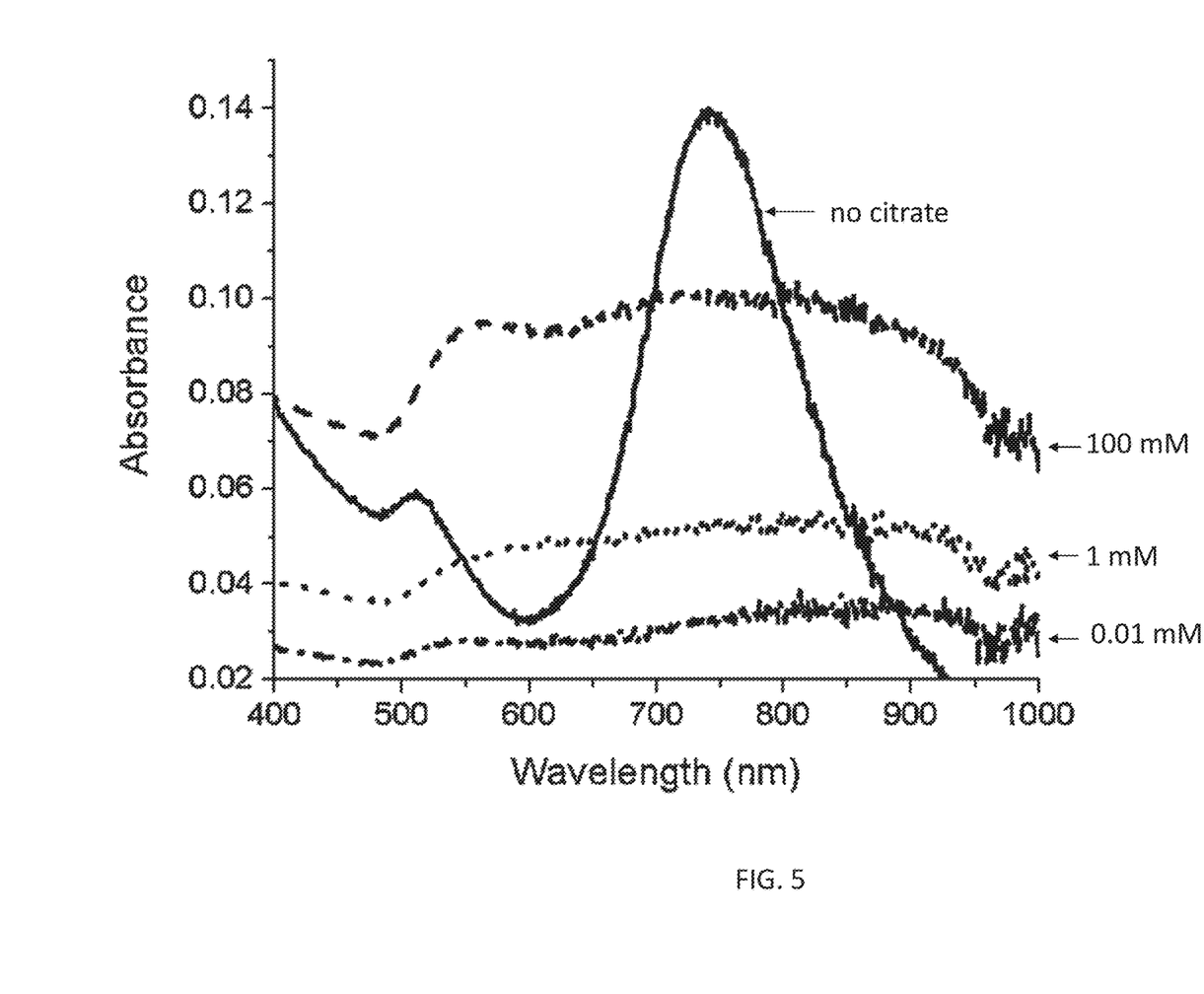
FIG. 5 shows optical absorbance spectra of GNRs stabilized in 100 mM, 1 mM, or 0.01 mM CTAB, before and after treatment with 5 mM sodium citrate, demonstrating the destabilizing effect of removing CTAB without the use of detergent in the cleansing process.

The incubation of GNRs with Na-PSS (minimum 1 hour, prior to each C/R step) is essential for producing well-dispersed cit-GNRs. It is established that PSS adsorbs weakly onto GNR surfaces in the absence of CTAB, resulting in metastable dispersions whose relative stability depends on Na-PSS concentration, suggestive of depletion effects. Attempts to exchange CTAB directly with citrate invariably led to rapid aggregation, regardless of surfactant concentrations. For instance, FIG. 5 shows absorbance spectra of GNR dispersions stabilized in 100 mM, 1 mM, or 0.01 mM CTAB, before and after treatment with 5 mM sodium citrate; all GNR dispersions were strongly aggregated after several hours' exposure to citrate, in the absence of PSS treatment.

Figure 6A:
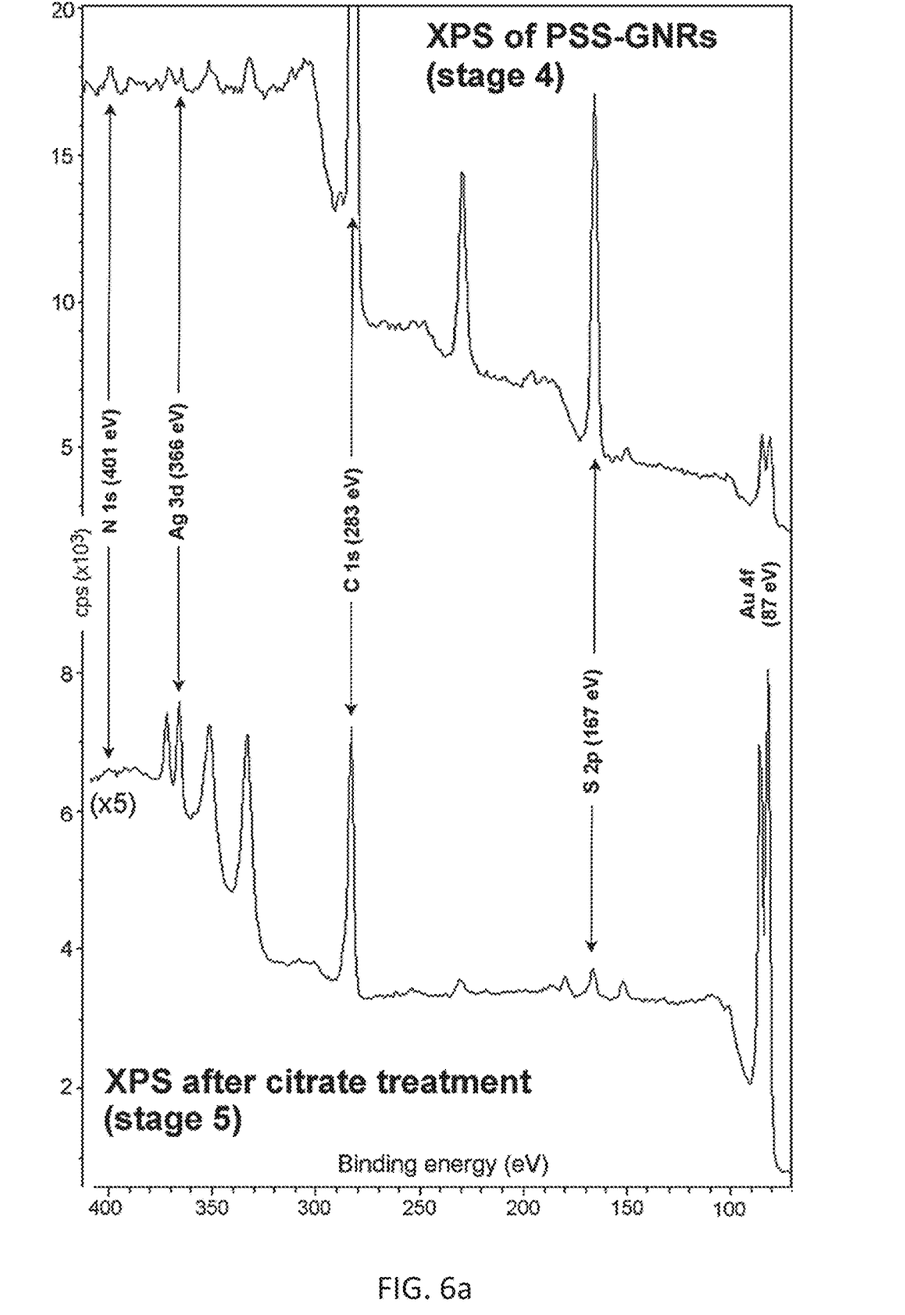
FIG. 6a shows survey spectra by X-ray photoelectron spectroscopy (XPS) acquired from pelleted GNR samples after Stage 4 (PSS wash #3) and Stage 5 (Citrate wash #1), demonstrating the reduction of N signal (associated with CTAB) below the limit of detection.
Figure 6B:
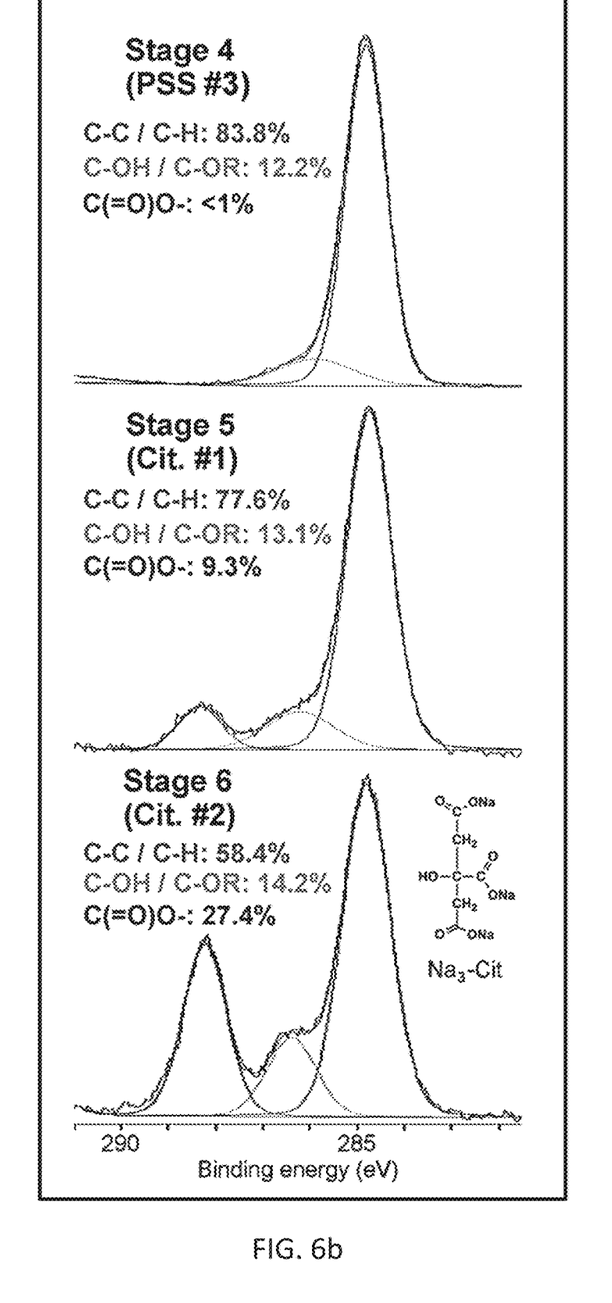
FIG. 6b shows high-resolution (regional) XPS spectra of the C 1s region, indicating citrate as the predominant surface species on the GNR samples at Stage 5 and 6.

The ligand exchange process from Stage 3 (PSS wash #2) to Stage 6 (citrate wash #2) was evaluated by XPS, based on the binding energies of various atomic species (Table 1 and FIGS. 6a and 6b). FIG. 6a shows survey XPS spectra acquired from pelleted GNR samples after Stage 4 (PSS wash #3) and Stage 5 (Citrate wash #1), indicating the disappearance of the N 1s signal. FIG. 6b shows high-resolution (regional) XPS spectra of the C 1s region, indicating relative changes in carbon subtype after treatment with citrate. The nitrogen (N 1s) content in the GNR samples was reduced to the limit of detection by Stage 5, thereby establishing the essentially complete removal of CTAB. The XPS signals for carbon (C 1s), oxygen (O 1s), sodium (Na 1s), and sulfur (S 2p) were also greatly reduced upon washing with 5 mM citrate (Stage 5), indicating the gross displacement of Na-PSS from the GNR surfaces (FIG. 6a). The S 2p signal was almost completely gone by the second citrate wash (Stage 6), and below trace levels in the supernatant. High-resolution analysis of the C is region further revealed that citrate exchange was accompanied by a change in the population of carbon subtypes, with a reduction in hydrocarbon species (C—H/C—C; 284.8 eV) and an increase in the density of carboxyl groups (C(=O)O; 288.2 eV), corresponding with the adsorption of citrate (FIG. 6b).

TABLE 1

XPS analysis of GNR samples at different purification stages

| Element (B.E., eV)c | Stage 3$^a$ (PSS #2) | bkgrnd$^b$ (PSS #2) | Stage 4$^a$ (PSS #3) | bkgrnd$^b$ (PSS #3) | Stage 5$^a$ (Cit. #1) | bkgrnd$^b$ (Cit. #1) | Stage 6$^a$ (Cit. #2) | bkgrnd$^b$ (Cit. #2) |
|---|---|---|---|---|---|---|---|---|
| C 1s (283) | 210 | 93.8 | 205 | 67.6 | 8.00 | 9.27 | 6.44 | 1.04 |
| N 1s (401) | 1.51 | — | 1.28 | — | 0.03$^d$ | — | 0.03$^d$ | — |
| O 1s (530) | 80.3 | 39.3 | 86.7 | 32.4 | 4.14 | 11.7 | 4.54 | 3.02 |
| Na 1s | 21.8 | 13.3 | 26.3 | 13.2 | 1.28 | 4.47 | 1.79 | 0.60 |
| S 2p (167) | 24.1 | 11.4 | 26.6 | 9.19 | 0.47 | 0.47 | 0.09 | <0.03$^d$ |
| Ag 3d | 0.25 | — | 0.26 | — | 0.28 | — | 0.26 | — |
| Si 2s (101) | — | 1 | — | 1 | — | 1 | — | 1 |
| Au 4f (82) | 1 | — | 1 | — | 1 | — | 1 | — |

$^a$Signals from pelleted GNR samples, normalized to Au 4f peak area.
$^b$Signals from supernatant of GNR samples, normalized to Si 2s peak area.
$^c$Binding energies from survey XPS spectra.
$^d$At or below limit of detection.

Figure 7:
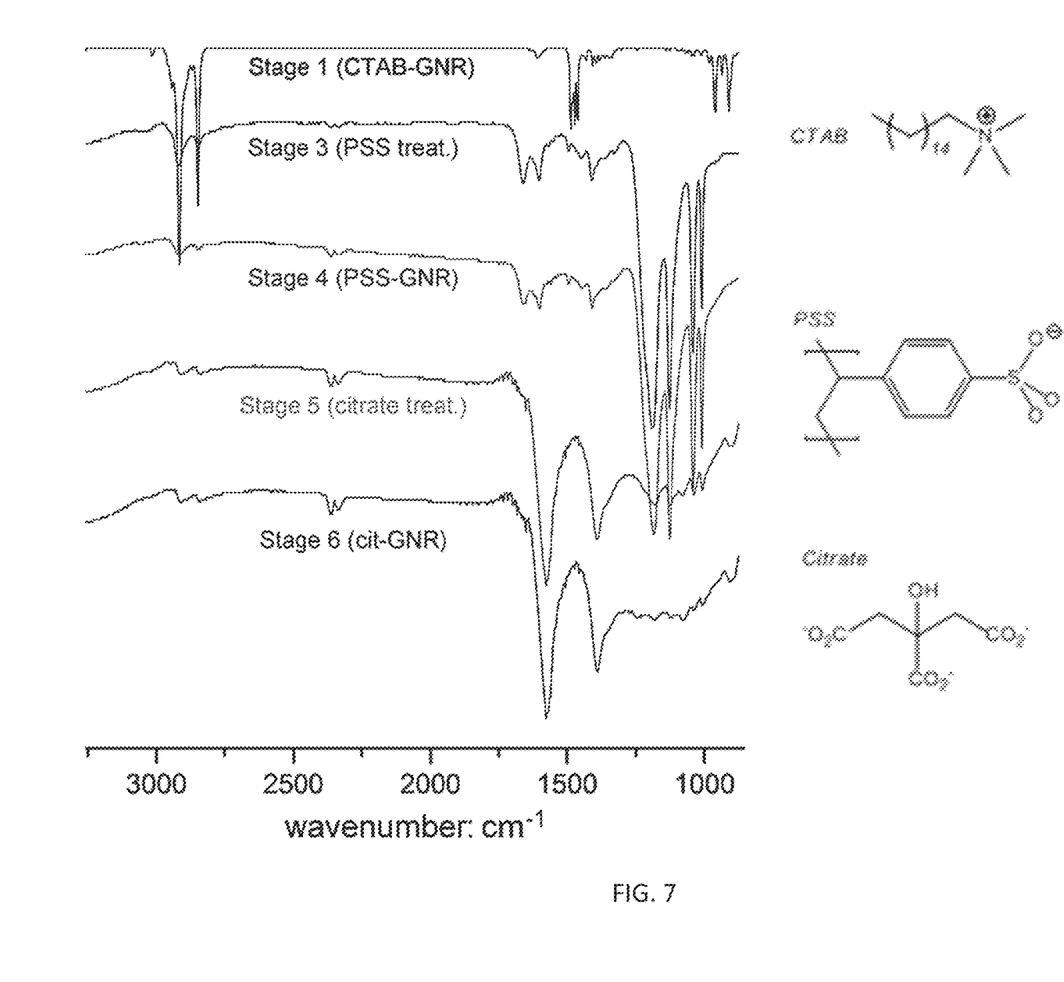
FIG. 7 shows attenuated total reflectance-infrared (ATR-IR) spectra of the cleansing process, indicating bulk ligand exchange.
Figure 8:
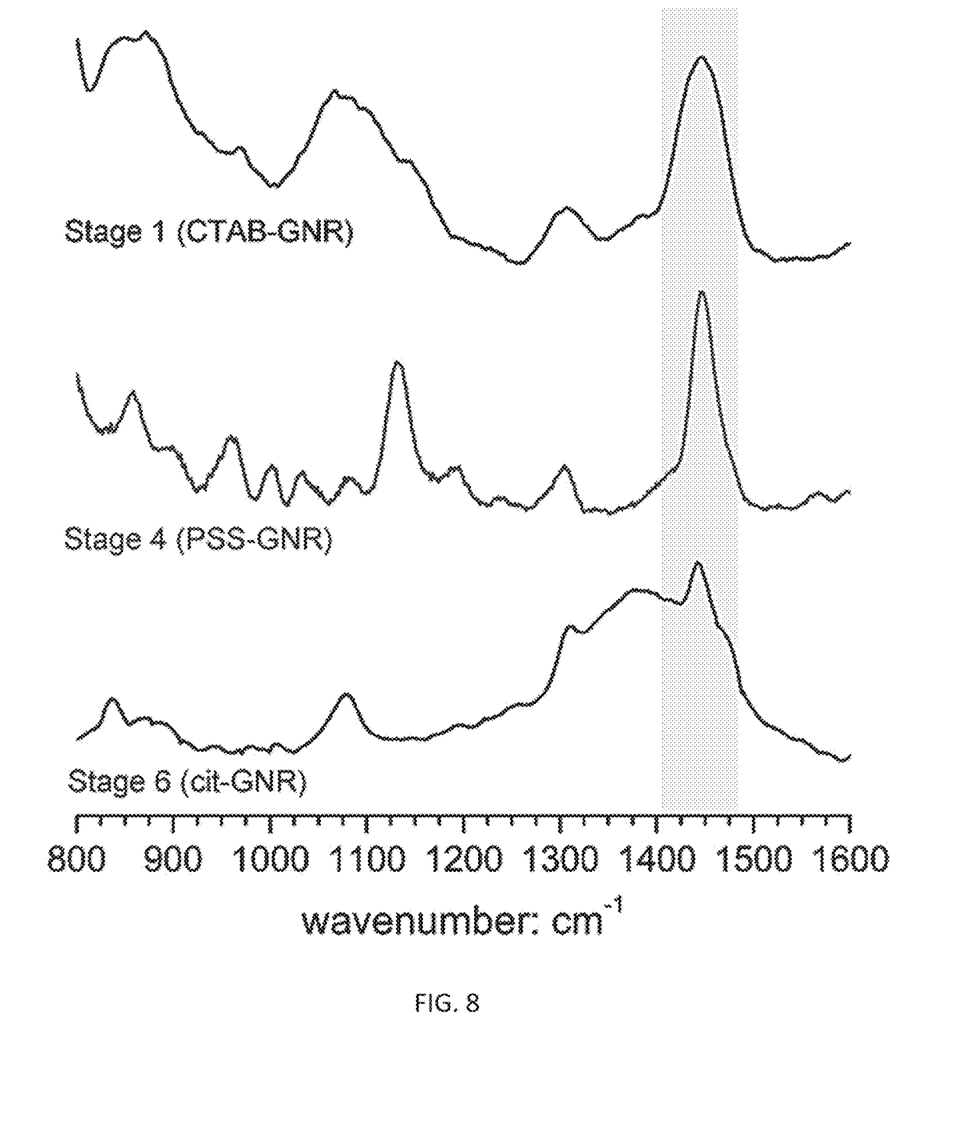
FIG. 8 shows surface-enhanced Raman scattering (SERS) spectra of the cleansing process, again indicating bulk ligand exchange. Loss of signal intensity at 1140 cm$^{-1}$ indicates the displacement of PSS from the GNR surface by citrate ions. The Raman band between 1420 and 1480 cm$^{-1}$ represents common C—H bending modes present in all surfactants.

The ligand exchange process was characterized by ATR-IR spectroscopy and SERS, to identify the molecular species associated with the GNR samples (FIGS. 7 and 8, respectively). IR analysis of pelleted GNR samples from Stages 1, 3, and 4 confirmed the presence (and depletion) of CTAB and PSS, with the former producing strong bands associated with sp$^3$ C—H stretching (2800-2900 cm$^{-1}$), —CH$_3$ deformation (1450-1480 cm$^{-1}$), and C—N stretching (900-950 cm$^{-1}$), and the latter producing peaks associated with the —SO$_3^-$ group (1020-1200 cm$^{-1}$). PSS displacement by citrate anions produced additional spectral changes, dominated by CO$_2^-$ stretching (1575 cm$^{-1}$) and —CH$_2$ deformation (1390 cm$^{-1}$). SERS analysis also confirmed that PSS was adsorbed onto GNRs by the enhanced SO$_3^-$ Raman signal, but was displaced after two washes with Na$_3$-cit. Overall, these vibrational analyses further supported the conclusions drawn from the XPS data.

The herein disclosed method describes a general approach for depleting CTAB and other cationic surfactants from aqueous nanoparticle suspensions, allowing their clean exchange with various surface ligands. Specifically, an efficient method is disclosed for removing cationic surfactants such as cetyltrimethylammonium bromide (CTAB) from aqueous suspensions of nanoparticles using sodium polystyrenesulfonate (Na-PSS), followed by the addition of peptizing agents to stabilize the cleansed nanoparticle solutes, including but not limited to anionic species such as citrate and oxalate, zwitterionic species such as sulfobetaines and carboxybetaines, or nonionic species such as Tween-20. In the case of citrate-stabilized GNRs, the materials are compatible with conjugation chemistries commonly applied to most metal colloids, and are useful for evaluating changes in particle size as a function of ligand structure.

Those skilled in the art will recognize that numerous modifications can be made to the specific implementations described above. The implementations should not be limited to the particular limitations described. Other implementations may be possible.

REFERENCES

1. Wei, A.; Leonov, A. P.; Wei, Q. S. Gold Nanorods: Multifunctional Agents for Cancer Imaging and Therapy. In *Cancer Nanotechnology: Methods and Protocols*, Grobmyer, S. R.; Moudgil, B. M., Eds. Humana Press Inc: Totowa, 2011; Vol. 624, pp 119-130.
2. Dreaden, E. C.; Alkilany, A. M.; Huang, X.; Murphy, C. J.; El-Sayed, M. A. The Golden Age: Gold Nanoparticles for Biomedicine. *Chem. Soc. Rev.* 2012, 41, 2740-2779.
3. Tong, L.; Wei, Q.; Wei, A.; Cheng, J.-X. Gold Nanorods as Contrast Agents for Biological Imaging: Surface Conjugation, Two-Photon Luminescence, and Photothermal Effects. *Photochem. Photobiol.* 2009, 85, 21-32.
4. Chou, C.-H.; Chen, C.-D.; Wang, C. R. C. Highly Efficient, Wavelength-Tunable, Gold Nanoparticle Based Optothermal Nanoconvertors. *J. Phys. Chem. B* 2005, 109, 11135-11138.
5. Yamashita, S.; Fukushima, H.; Niidome, Y.; Mori, T.; Katayama, Y.; Niidome, T. Controlled-Release System Mediated by a Retro Diels-Alder Reaction Induced by the Photothermal Effect of Gold Nanorods. *Langmuir* 2011, 27, 14621-14626.
6. Wijaya, A.; Schaffer, S. B.; Pallares, I. G.; Hamad-Schifferli, K. Selective Release of Multiple DNA Oligonucleotides from Gold Nanorods. *ACS Nano* 2009, 3, 80-86.
7. Kuo, T.-R.; Hovhannisyan, V. A.; Chao, Y.-C.; Chao, S.-L.; Chiang, S.-J.; Lin, S.-J.; Dong, C.-Y.; Chen, C.-C. Multiple Release Kinetics of Targeted Drug from Gold Nanorod Embedded Polyelectrolyte Conjugates Induced by near-Infrared Laser Irradiation. *J. Am. Chem. Soc.* 2010, 132, 14163-14171.
8. Dickerson, E. B.; Dreaden, E. C.; Huang, X.; El-Sayed, I. H.; Chu, H.; Pushpanketh, S.; McDonald, J. F.; El-Sayed, M. A. Gold Nanorod Assisted near-Infrared Plasmonic Photothermal Therapy (PPTT) of Squamous Cell Carcinoma in Mice *Cancer Lett.* 2008, 269, 57-66.
9. von Maltzahn, G.; Park, J.-H.; Agrawal, A.; Bandaru, N. K.; Das, S. K.; Sailor, M. J.; Bhatia, S. N. Computationally Guided Photothermal Tumor Therapy Using Long-Circulating Gold Nanorod Antennas. *Cancer Res.* 2009, 69, 3892-3900.
10. Choi, W. I.; Kim, J.-Y.; Kang, C.; Byeon, C. C.; Kim, Y. H.; Tae, G. Tumor Regression in Vivo by Photothermal Therapy Based on Gold-Nanorod-Loaded, Functional Nanocarriers. *ACS Nano* 2011, 5, 1995-2003.
11. Mehtala, J. G.; Torregrosa-Allen, S.; Elzey, B. D.; Jeon, M.; Kim, C.; Wei, A. Synergistic Effects of Cisplatin Chemotherapy and Gold Nanorod-Mediated Hyperthermia on Ovarian Cancer Cells. *Nanomedicine* 2014, 9, in press (doi: 10.2217/nnm.13.209).
12. Huff, T. B.; Hansen, M. N.; Zhao, Y.; Cheng, J.-X.; Wei, A. Controlling the Cellular Uptake of Gold Nanorods. *Langmuir* 2007, 23, 1596-1599.
13. Alkilany, A. M.; Nagaria, P. K.; Hexel, C. R.; Shaw, T. J.; Murphy, C. J.; Wyatt, M. D. Cellular Uptake and Cytotoxicity of Gold Nanorods: Molecular Origin of Cytotoxicity and Surface Effects. *Small* 2009, 5, 701-708.
14. Liao, H.; Hafner, J. H. Gold Nanorod Bioconjugates. *Chem. Mater* 2005, 17, 4636-4641.
15. Kinnear, C.; Dietsch, H.; Clift, M. J.; Endes, C.; Rothen-Rutishauser, B.; Petri-Fink, A. Gold Nanorods: Controlling Their Surface Chemistry and Complete Detoxification by a Two-Step Place Exchange. *Angew. Chem. Int. Ed.* 2013, 52, 1934-1938.
16. Takahashi, H.; Niidome, Y.; Niidome, T.; Kaneko, K.; Kawasaki, H.; Yamada, H. Modification of Gold Nanorods Using Phosphatidylcholine to Reduce Cytotoxicity. *Langmuir* 2006, 22, 2-5.
17. Leonov, A. P.; Zheng, J.; Clogston, J. D.; Stern, S. T.; Patri, A. K.; Wei, A. Detoxification of Gold Nanorods by Treatment with Polystyrenesulfonate. *ACS Nano* 2008, 2, 2481-2488.
18. Indrasekara, A. S. D. S.; Wadams, R. C.; Fabris, L. Ligand Exchange on Gold Nanorods: Going Back to the Future. Part. *Part. Syst. Charact.* 2014, 31, in press.
19. Hayat, M. A. *Colloidal Gold: Principles, Methods, and Applications*. Academic Press: San Diego, 1989; Vol. 1.
20. Mehtala, J. G.; Wei, A. Nanometric Resolution in the Hydrodynamic Size Analysis of Ligand-Stabilized Gold Nanorods. *Langmuir* 2014, manuscript submitted.
21. Khanal, B. P.; Zubarev, E. R. Rings of Nanorods. *Angew. Chem. Int. Ed.* 2007, 46, 2195-2198.
22. Semchyschyn, D. J.; Carbone, M. A.; Macdonald, P. M. Anionic Polyelectrolyte Binding to Mixed Cationic-Zwitterionic Surfactant Micelles: A Molecular Perspective from $^2$H NMR Spectroscopy. *Langmuir* 1996, 12, 253-260.
23. Napper, D. H. *Polymer Stabilization of Colloid Dispersions*. Academic: New York, 1983.
24. Takeda, S.-i.; Tobori, N.; Sugawara, H.; Furusawa, K. Dynamic Electrophoresis. In *Electrical Phenomena at Interfaces: Fundamentals: Measurements, and Applications,* 2nd ed.; Ohshima, H.; Furusawa, K., Eds. CRC Press: Boca Raton, 1998; pp 273-304.
25. Kawamura, G.; Yang, Y.; Nogami, M. End-to-End Assembly of CTAB-Stabilized Gold Nanorods by Citrate Anions. *J. Phys. Chem. C* 2008, 112, 10632-10636.
26. Nikoobakht, B.; El-Sayed, M. A. Preparation and growth mechanism of gold nanorods (NRs) using seed-mediated growth method. *Chem. Mater* 2003, 15, 1957-1962.
27. Sau, T. K.; Murphy, C. J. Seeded High Yield Synthesis of Short Au Nanorods in Aqueous Solution. *Langmuir* 2004, 20, 6414-6420.
28. Liu, M. Z.; Guyot-Sionnest, P. Mechanism of Silver(I)-Assisted Growth of Gold Nanorods and Bipyramids. *J. Phys. Chem. B* 2005, 109, 22192-22200.
29. Jackson, S. R.; McBride, J. R.; Rosenthal, S. J.; Wright, D. W. Where's the Silver? Imaging Trace Silver Coverage on the Surface of Gold Nanorods. *J. Am. Chem. Soc.* 2014, 136, 5261-5263.
30. Lin-Vien, D.; Colthup, N. B.; Fateley, W. G.; Grasselli, J. G. *The Handbook of Infrared and Raman Characteristic Frequencies of Organic Molecules*. 2nd ed.; Academic Press: San Diego, 1991.

The invention claimed is:
1. A method for converting CTAB-stabilized GNRs into citrate-stabilized GNRs, comprising:
filtering excess surfactant from a GNR-CTAB suspension to result in a concentrated GNR-CTAB suspension;
subjecting GNR-CTAB suspension to at least one centrifugation and redispersion cycle with solutions containing a mild detergent to deplete CTAB below trace levels, resulting in a CTAB-free GNR suspension; and
subjecting CTAB-depleted GNR suspension to at least one centrifugation and redispersion cycle using sodium citrate solutions to produce suspensions of citrate-stabilized GNRs, devoid of detergent.
2. The method of claim 1, further comprising diluting the suspension of CTAB-stabilized GNRs to 25 mM CTAB.
3. The method of claim 1, further comprising filtering the suspension of CTAB-stabilized GNRs by stirred ultrafiltration.
4. The method of claim 1, wherein the mild detergent is sodium polystyrenesulfonate (Na-PSS).
5. The method of claim 4, the Na-PSS concentration being 0.15 wt %.
6. The method of claim 1, the diluted GNR-CTAB suspension being subject to three centrifugation and redispersion cycles with 0.15 wt % Na-PSS.
7. The method of claim 1, the CTAB-depleted GNR suspension being subjected to two centrifugation and redispersion cycles with aqueous sodium citrate.
8. The method of claim 1, the sodium citrate being at a concentration between 10 μM and 10 mM.
9. The method of claim 1, the conversion of CTAB-GNRs into citrate-stabilized GNRs being 75% to 85%.
10. A method for removing cetyltrimethylammonium bromide (CTAB) from aqueous suspensions of gold nanorods (GNRs), comprising:
intermediate treatment of a suspension of GNRs with sodium polystyrenesulfonate (Na-PSS) resulting in a treated GNR suspension; and
subjecting the treated GNR suspension by further exchange with sodium citrate to produce citrate-stabilized GNRs (cit-GNRs).
11. A composition comprising citrate stabilized GNRs prepared by the method of claim 1.
12. A method of removing a cationic surfactant from a suspension of gold nanoparticles and preparing peptizing agent stabilized said gold nanoparticles, comprising:
adding an anionic polymeric detergent to said suspension of gold nanoparticles to remove said cationic surfactant, resulting in a suspension depleted of said cationic surfactant to below detectable limit by X-ray photoelectron spectroscopy; and
adding a peptizing agent to stabilize the cleansed gold nanoparticles, wherein said peptizing agent is selected from the group consisting of an anionic species, a zwitterion species, a nonionic species, and any combination thereof, and wherein said gold nanoparticles have hydrodynamic sizes between 1-200 nm.
13. A composition comprising peptizing agent stabilized GNRs, wherein the composition is essentially depleted CTAB or other cationic surfactant to below detectable limit by X-ray photoelectron spectroscopy.
14. The composition of claim 13, wherein the peptizing agent is selected from the group consisting of an anionic species, a zwitterionic species, a nonionic species, and any combination thereof.

15. The composition of claim 14, wherein the peptizing agent comprises citrate.

\* \* \* \* \*